United States Patent
Yang (10) Patent No.: US 11,410,484 B2
(45) Date of Patent: Aug. 9, 2022

(54) COMMODITY DELIVERY AND MICROWAVE SYSTEM FOR POPCORN VENDING MACHINE

(71) Applicant: Chung-Po Yang, Kaohsiung (TW)

(72) Inventor: Chung-Po Yang, Kaohsiung (TW)

(*) Notice: Subject to any disclaimer, the term of this patent is extended or adjusted under 35 U.S.C. 154(b) by 819 days.

(21) Appl. No.: 16/351,537

(22) Filed: Mar. 13, 2019

(65) Prior Publication Data

US 2019/0371109 A1 Dec. 5, 2019

(30) Foreign Application Priority Data

May 29, 2018 (TW) .................................. 107207054

(51) Int. Cl.
| | |
|---|---|
| *G07F 11/70* | (2006.01) |
| *G07F 17/00* | (2006.01) |
| *G07F 9/10* | (2006.01) |
| *G07F 13/10* | (2006.01) |
| *G07F 11/62* | (2006.01) |
| *A23L 7/165* | (2016.01) |

(52) U.S. Cl.
CPC .......... *G07F 17/0078* (2013.01); *G07F 9/105* (2013.01); *G07F 11/62* (2013.01); *G07F 11/70* (2013.01); *G07F 13/10* (2013.01); *A23L 7/165* (2016.08)

(58) Field of Classification Search
USPC .................................................. 221/150 HC
See application file for complete search history.

(56) References Cited

U.S. PATENT DOCUMENTS

| | | | | |
|---|---|---|---|---|
| 4,398,651 A | * | 8/1983 | Kumpfer .................... | G07F 9/02 99/359 |
| 5,209,373 A | * | 5/1993 | Gondek .................. | H05B 6/808 219/679 |
| 5,522,310 A | * | 6/1996 | Black, Sr. ............... | A47J 27/14 221/113 |
| 5,799,822 A | * | 9/1998 | Rudewicz .............. | H05B 6/808 219/678 |
| 6,204,491 B1 | * | 3/2001 | Montani ................ | H05B 6/808 219/679 |
| 2010/0025422 A1 | * | 2/2010 | Bjornvall ................ | G07F 11/10 219/756 |

* cited by examiner

*Primary Examiner* — Gene O Crawford
*Assistant Examiner* — Ayodeji T Ojofeitimi
(74) *Attorney, Agent, or Firm* — Leong C. Lei (57) ABSTRACT

A commodity delivery and microwave system for a popcorn vending machine includes: a storage rack, adapted to mount popcorn kernel packages, an opening configured on a lower side of the storage rack, the opening allowing the popcorn kernel package to be moved out therethrough; a delivering device, configured below the storage rack, and adapted to push the popcorn kernel package out of the storage rack and send the popcorn kernel package into a microwave heating device; and the microwave heating device, configured beside the storage rack and including a support bracket, the support bracket configured with a microwave heater having a side door corresponding to storage rack and an open bottom, a door opening and closing device configured on the microwave heater and adapted to open or close the side door, a lower cover plate coupled pivotally to the support bracket.

8 Claims, 13 Drawing Sheets

COMMODITY DELIVERY AND MICROWAVE SYSTEM FOR POPCORN VENDING MACHINE

(a) TECHNICAL FIELD OF THE INVENTION

The present invention relates to a commodity deliver and microwave system for a popcorn vending machine, a more particularly to a microwave popcorn delivery and microwave system capable of improving the convenience of popcorn commodity output.

(b) DESCRIPTION OF THE PRIOR ART

Because the vending machines have the advantage of convenient and fast purchase and save labor cost, they are at present widely set up especially in crowd gathering places such as amusement parks, parks, zoos, company line numbers, government agencies, transportation stations, department stores, museums, art galleries, retail stores, capable of bringing store functions into full play and increasing purchasing convenience. The commodities sold by vending machines grow broadly from beverages, biscuits, instant noodles, newspapers and etc. to fruits, flowers, bakery, and etc., and even to hot coffee, ramen, popcorn, frozen microwave food (e.g. takoyaki, taiyaki, fried noodles, burgers, pizza, etc.) by installing a heating device thereon additionally. Therefore, commodities sold by the current vending machines become more diversified, and further conform to and satisfy most people's requirements, which is a highly economical machine and sales model.

In the case of popcorn vending machines, Taiwan patent application No. 095121370, titled "vending machine for heating food ingredients", for example, stacks a plurality of popcorn packages in a storage tank; the launch mechanism can eject the lowest popcorn kernel package to the cover configured above the microwave heating conditioner, and the delivering device configured on the upper end of the microwave heating conditioner is then lowered down to suck the popcorn kernel package. Thereafter, the delivering device is risen with the popcorn kernel package to allow the cover of the microwave heating conditioner to be opened. At this time, the delivering device and the popcorn kernel package are lowered down and the popcorn kernel package is allowed to drop into the microwave heating conditioner, and the cover is then closed to allow the microwave heating of the popcorn kennel package to be carried out. When the heating is completed, the cover is opened, and the delivering device sucks the heated popcorn package and takes it out of the microwave heating conditioner. Thereafter, the delivering device then places the popcorn on the cover and then inclines the cover to allow the popcorn to fall to the mouth of the popcorn machine so that a purchaser can take it away.

The above vending machine for heating food ingredients is provided with the convenience of storing, selling and heating popcorn, but not only complexity of the device and facilities thereof but also the wear and tear of the delivering device is increased. In addition, the cover configured on the microwave heating conditioner is also easy to be decreased in its use life because of repeated opening and closing.

SUMMARY OF THE INVENTION

To overcome the above disadvantages, the present invention is proposed.

One object of the present invention is to provide a commodity delivery and microwave system for a popcorn vending machine, capable of improving popcorn commodity output convenience.

To achieve the object mentioned above, the present invention proposes a commodity delivery and microwave system for a popcorn vending machine, including a storage rack, delivering device and microwave heating device, wherein: the storage rack, adapted to mount popcorn kernel packages, an opening configured on a lower side of the storage rack, the opening allowing the popcorn kernel package to be moved out therethrough, a bottom of the storage rack configured with a long gap, the long gap formed into an open end, and the open end correspondingly configured below the opening; the delivering device, configured below the storage rack, and adapted to push the popcorn kernel package out of the storage rack and send the popcorn kernel package into the microwave heating device; and the microwave heating device, configured beside the storage rack and including a support bracket, the support bracket configured with a microwave heater, a side door configured on one side of the microwave heater corresponding to storage rack, a bottom of the microwave heater being open, a door opening and closing device configured on a position of the microwave heater corresponding to the side door, the side door opening and closing device adapted to open or close the side door, a lower cover plate coupled pivotally to the support bracket through a shaft, the lower cover plate exactly covered and closed on the bottom of the microwave heater, the support bracket configured with a drive element, and a drive end of the drive element coupled pivotally to the lower cover plate, allowing the lower cover plate to be driven to rotate with the shaft as a fulcrum.

DETAILED DESCRIPTION OF THE PREFERRED EMBODIMENTS

Figure 1:
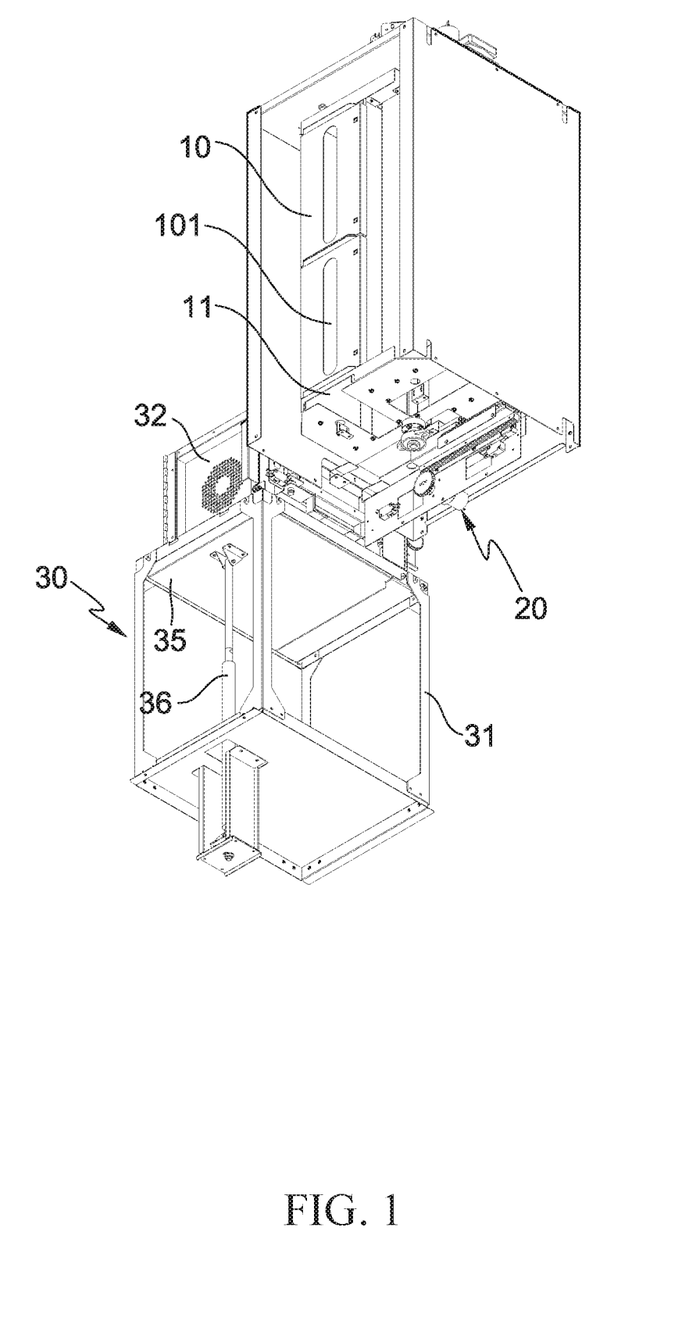
FIG. 1 is a perspective view of the present invention.

Referring to FIG. 1, a delivery and microwave system, in a preferred embodiment, includes a storage rack 10, delivering device 20 and microwave heating device 30.

Figure 2:
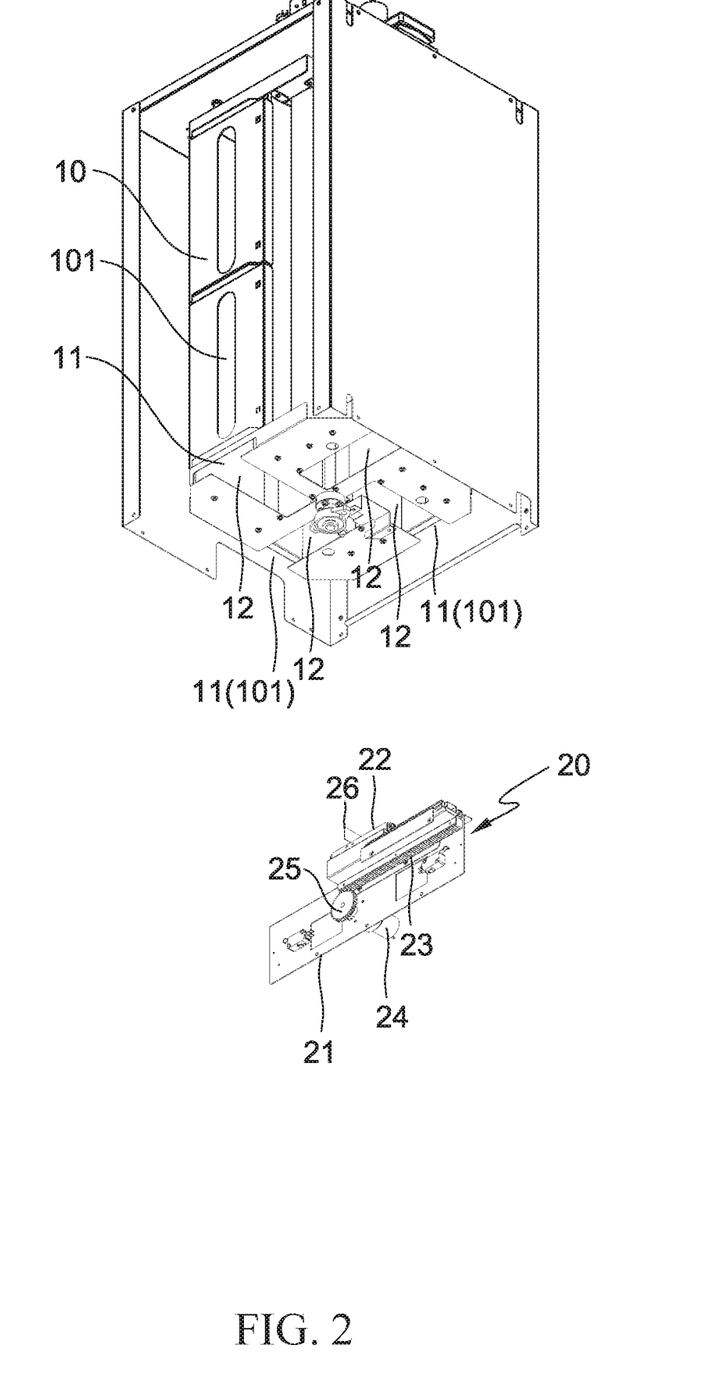
FIG. 2 is an exploded view of the present invention, where a storage rack and delivering device are shown.
Figure 7:
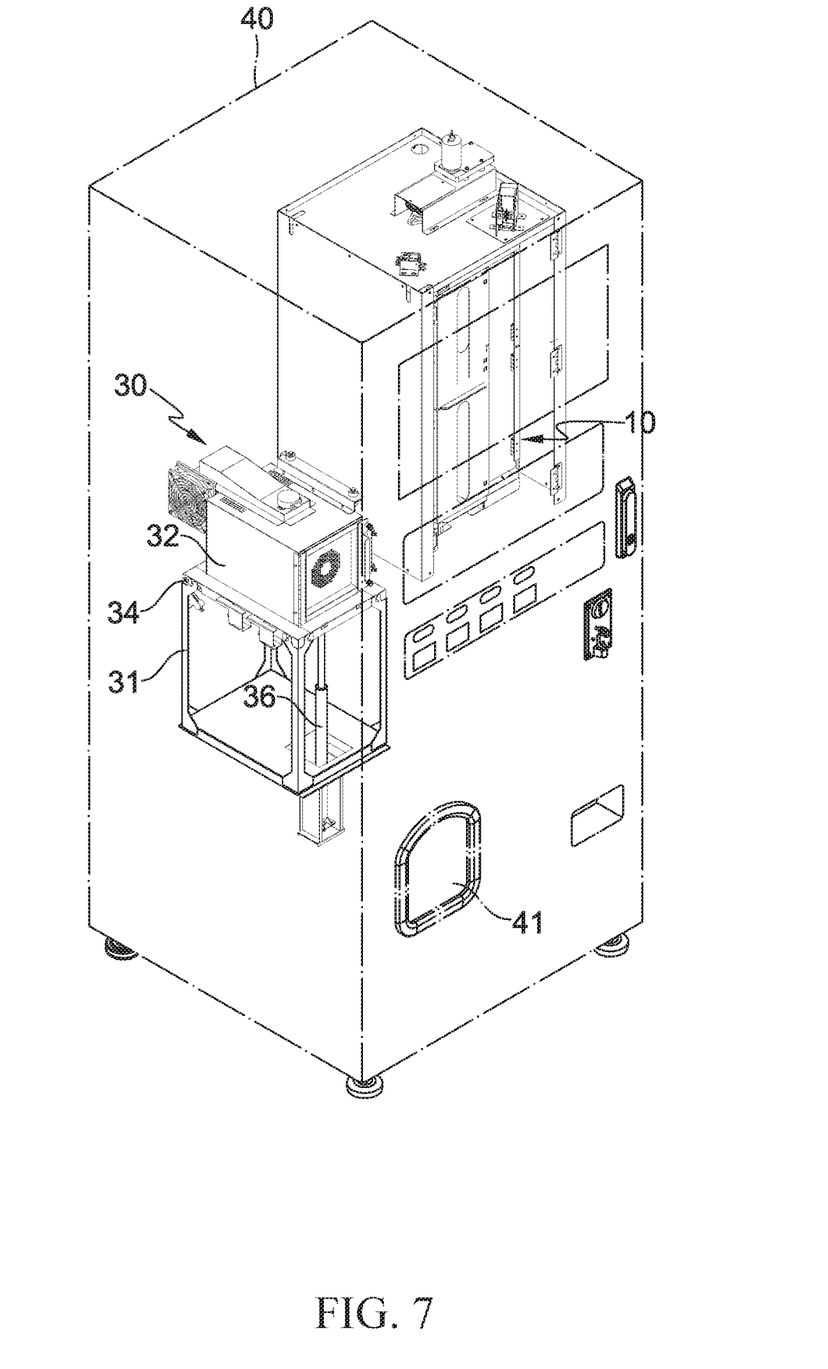
FIG. 7 is a perspective view of the present invention installed on a popcorn machine according to the present invention.
Figure 8:
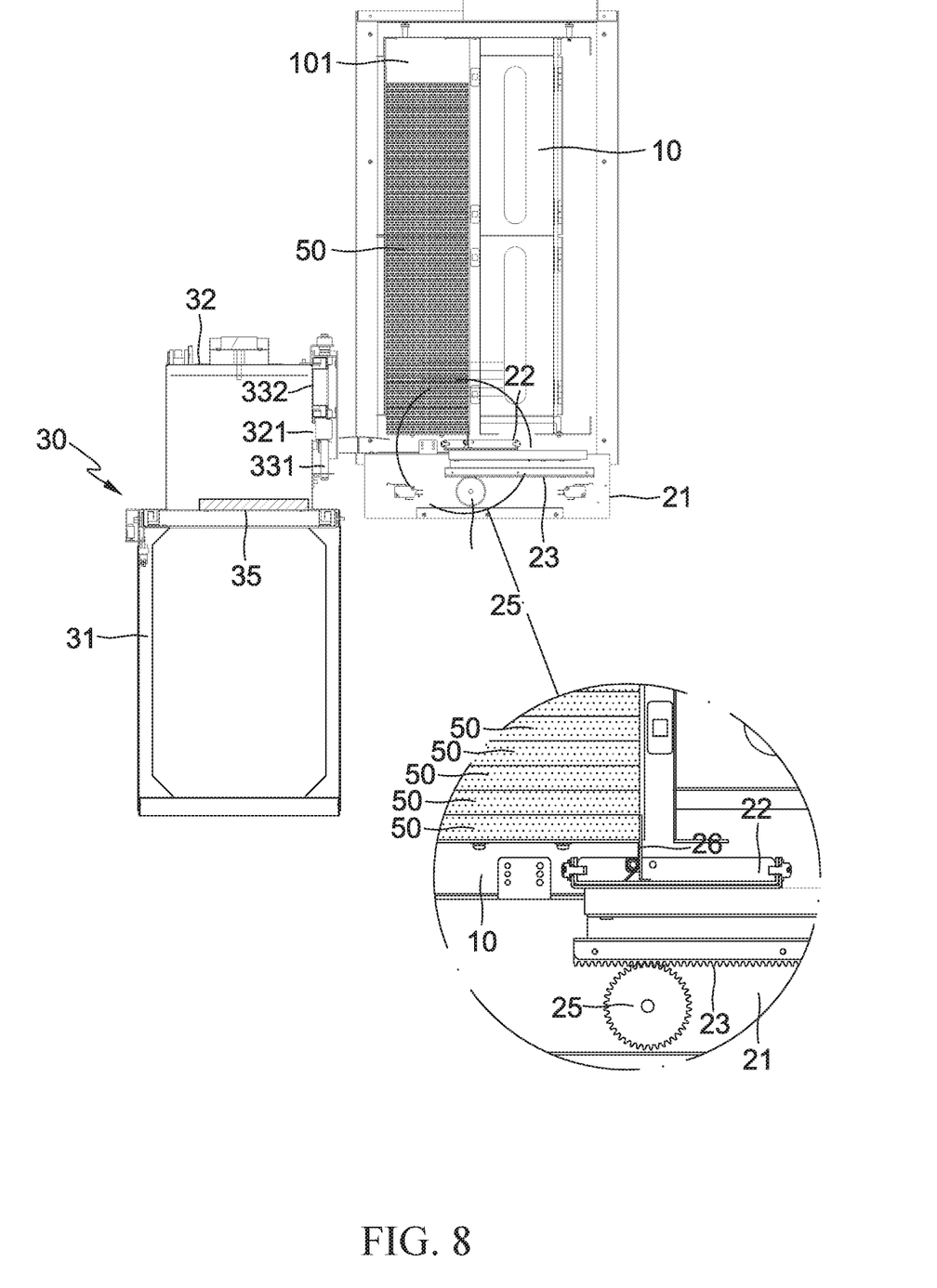
FIG. 8 is a cross-sectional view of the present invention.

Also referring to FIGS. 2, 7 and 8, the storage rack 10 is used to provide the mounting of popcorn kernel packages 50 thereon, and the lower side of the storage rack 10 has an opening 11 allowing the popcorn kernel packages 50 to be moved out. Furthermore, the bottom side of the storage rack 10 has a long gap 12, the front of which is formed into an open end.

According to the above, the storage rack 10, as FIGS. 1 and 2 show, may be a rotatable storage rack 10 having several storage tanks 101, the lower side of each of which is configured with an opening 11 allowing the popcorn kernel packages 50 to be moved out. Furthermore, the bottom side of the storage rack 10 is configured with a long gap 12 having an open end 121 configured correspondingly below the opening 11.

Also referring to FIGS. 2, 3 and 8, the delivering device 20 is coupled pivotally below the storage rack 10 and used to push the popcorn kernel package 50 out of the storage rack 10 and send it into the microwave heating device 30.

Figure 3:
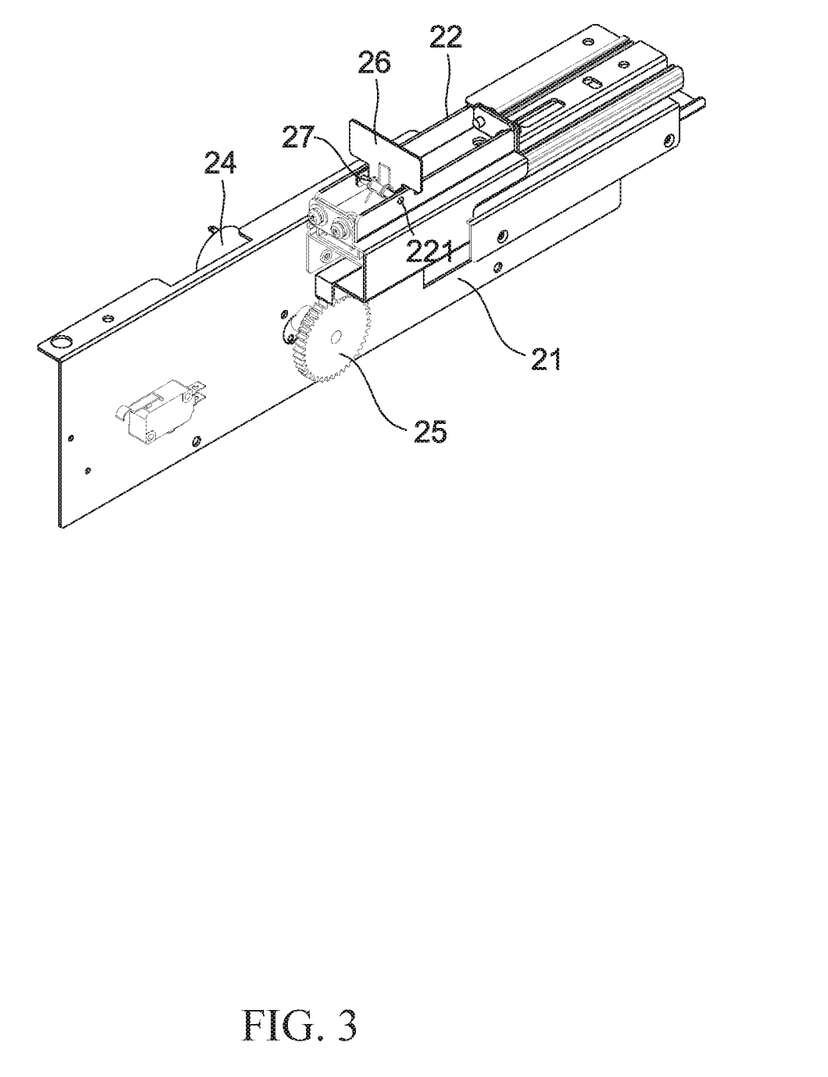
FIG. 3 is a perspective view of the delivering device of the present invention.
Figure 4:
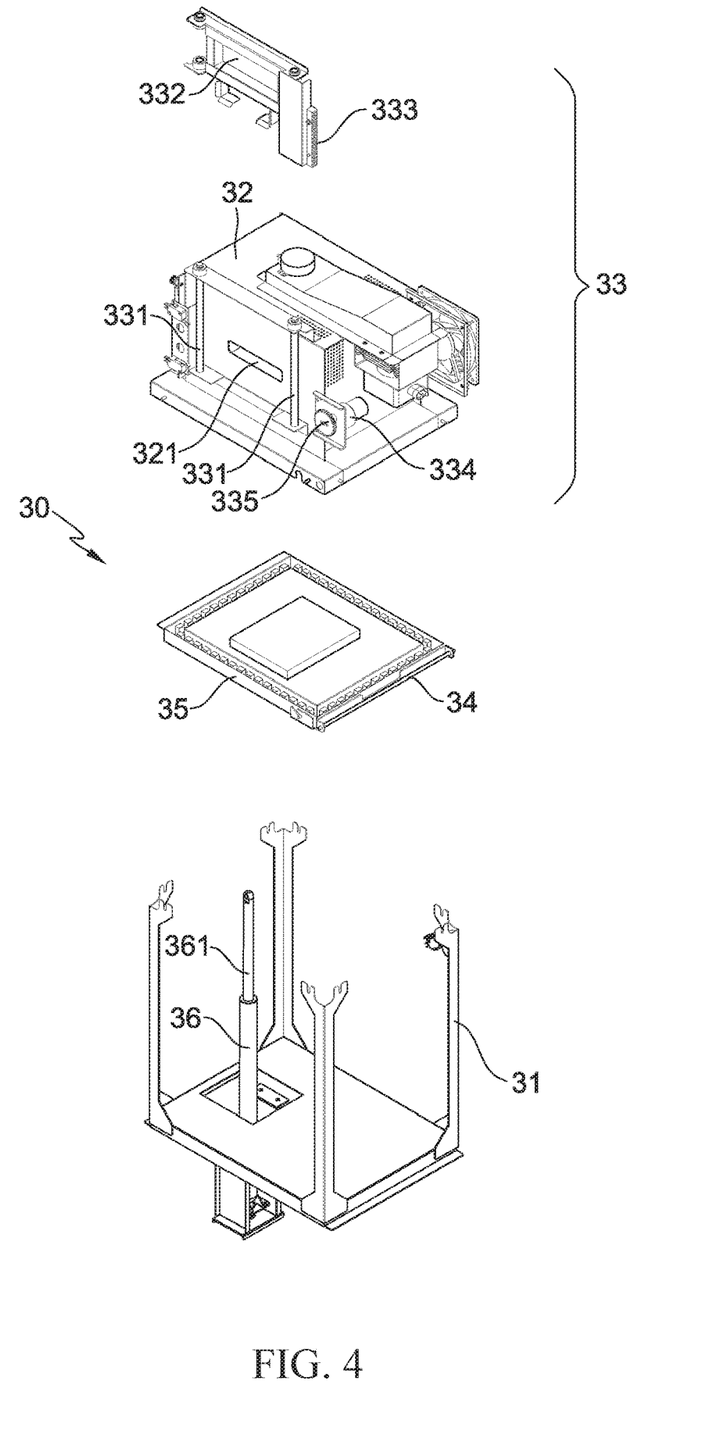
FIGS. 4 and 5 respectively are an exploded view of a microwave heating device of the present invention.
Figure 5:
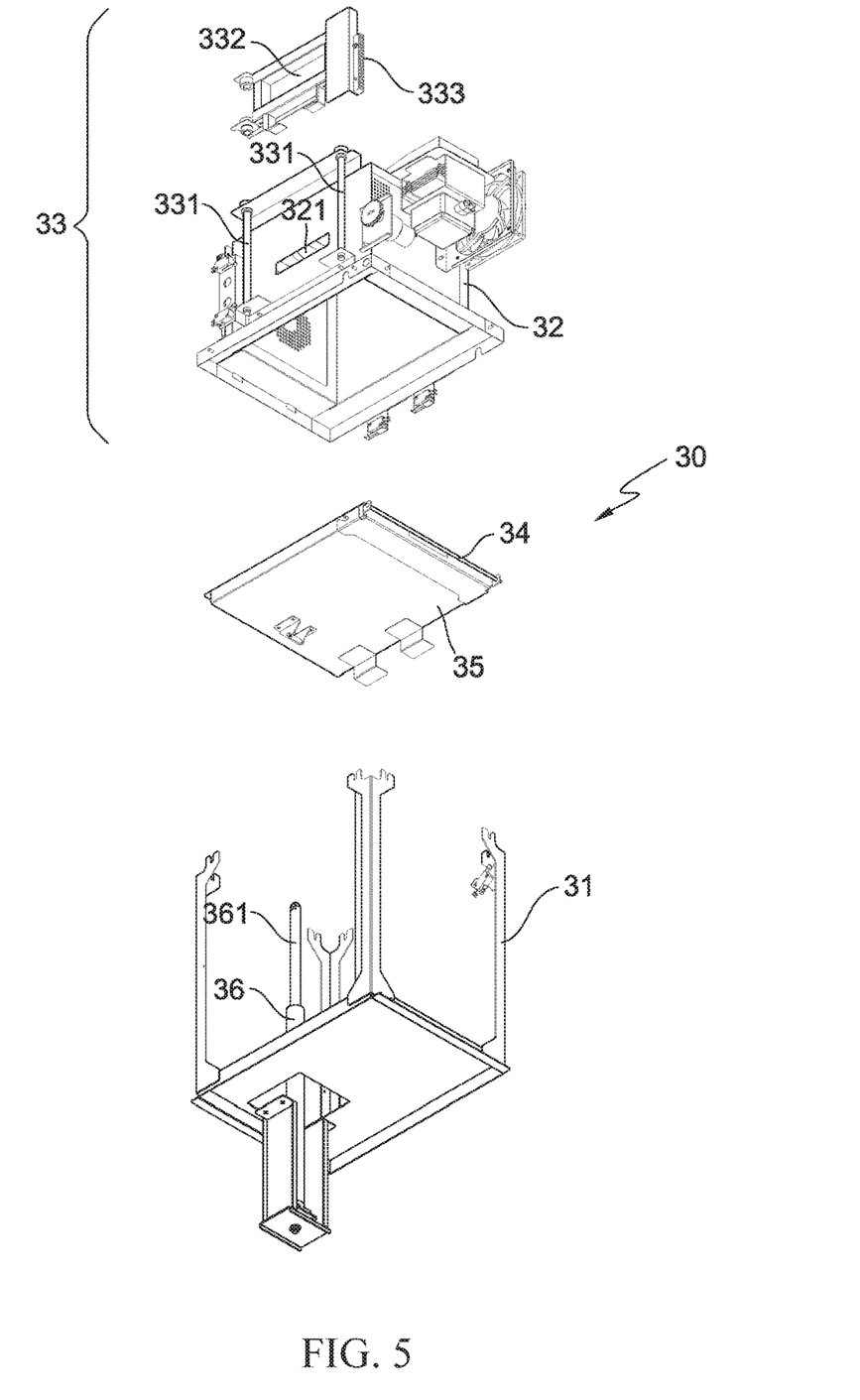
Figure 6:
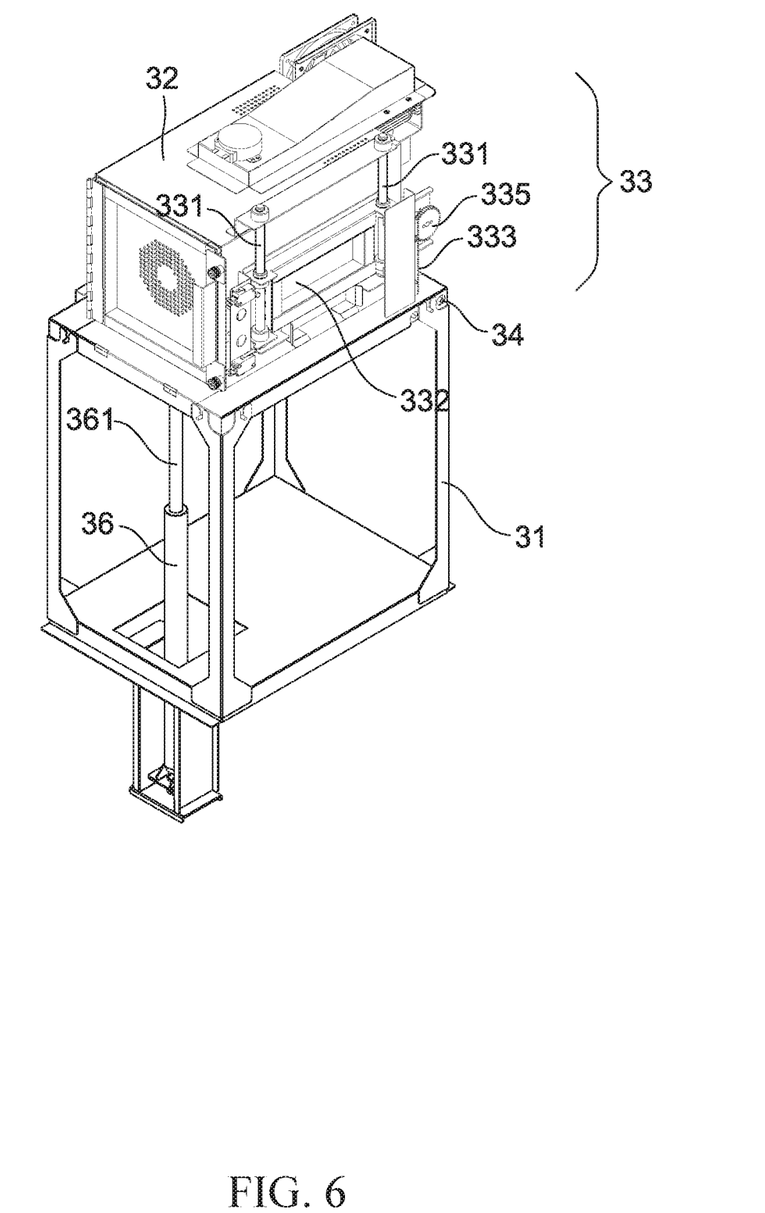
FIG. 6 is a perspective view of the microwave heating device of the present invention.

According to the above, the delivering device 20, as FIGS. 2 and 3 show, includes a fixing rack 21, on which a push seat 22 is configured, and a tooth row 23 is configured on the lower side of the push seat 22. Furthermore, the fixing rack 21 is configured with a drive motor 24 in connection with a gear 25 in engagement with the tooth row 23, where the drive motor 24 drives the gear 25 to rotate to drive the teeth row 23 to move forward and backward and drive the push seat 22 and fixing rack 21 to move forward and backward synchronously. Furthermore, a push plate 26 is coupled pivotally to the push seat 22 through a pivot point 221, and a spring 27 is configured between the push plate 26 and push seat 22, allowing the push plate 26 to be pushed against to be upright by the spring 27, where the push plate 26 can be turned downward by taking the pivot point 221 as a center when exerted with a force.

Also referring to FIGS. 4 to 8, the microwave heating device 30 is located beside the storage rack 10 and includes a support bracket 31 on which a microwave heater 32 is configured, where a side door 321 is configured on one side of the microwave heater 32 corresponding to the storage rack 10, and the bottom side of the microwave heater 32 is open. Furthermore, a side door opening and closing device 33 adapted to open or close the side door 321 is configured on a position of the microwave heater 32 corresponding to the side door 321; a lower cover plate 35 is coupled pivotally to the support bracket 31 through a shaft 34, and the lower cover plate 35 can be exactly covered and closed on the bottom side of the microwave heater 32; the support bracket 31 is configured with a drive element 36, and the lower cover plate 35 is coupled pivotally to a drive end 361 of the drive element 36, allowing the lower cover plate 35 to be driven by the drive element 36 to rotate with the shaft 34 as a fulcrum.

According to the above, the side door opening and closing device 33, as FIGS. 4, 5, 6 and 8, includes two guide rods 331 configured on the side where the corresponding side door 321 of the microwave heater 32 is located, and a door plate 332 is disposed between the two guide rods 331, where the door plate 332 can be moved up and down between the two guide rods 331. Furthermore, the door plate 332 is configured with a teeth row; the side door opening and closing device 33 further includes a drive motor 334 configured on the microwave heater 32 and in connection with a transmission gear 335 in engagement with a tooth row 333 configured on the door plate 332, whereby, the drive motor 334 drives the transmission gear 335 to rotate to cause the transmission gear 335 to drive the tooth row 333 of the door plate 332 to move up and down and to drive the door plate 332 to move up and down at the same time.

Figure 9:
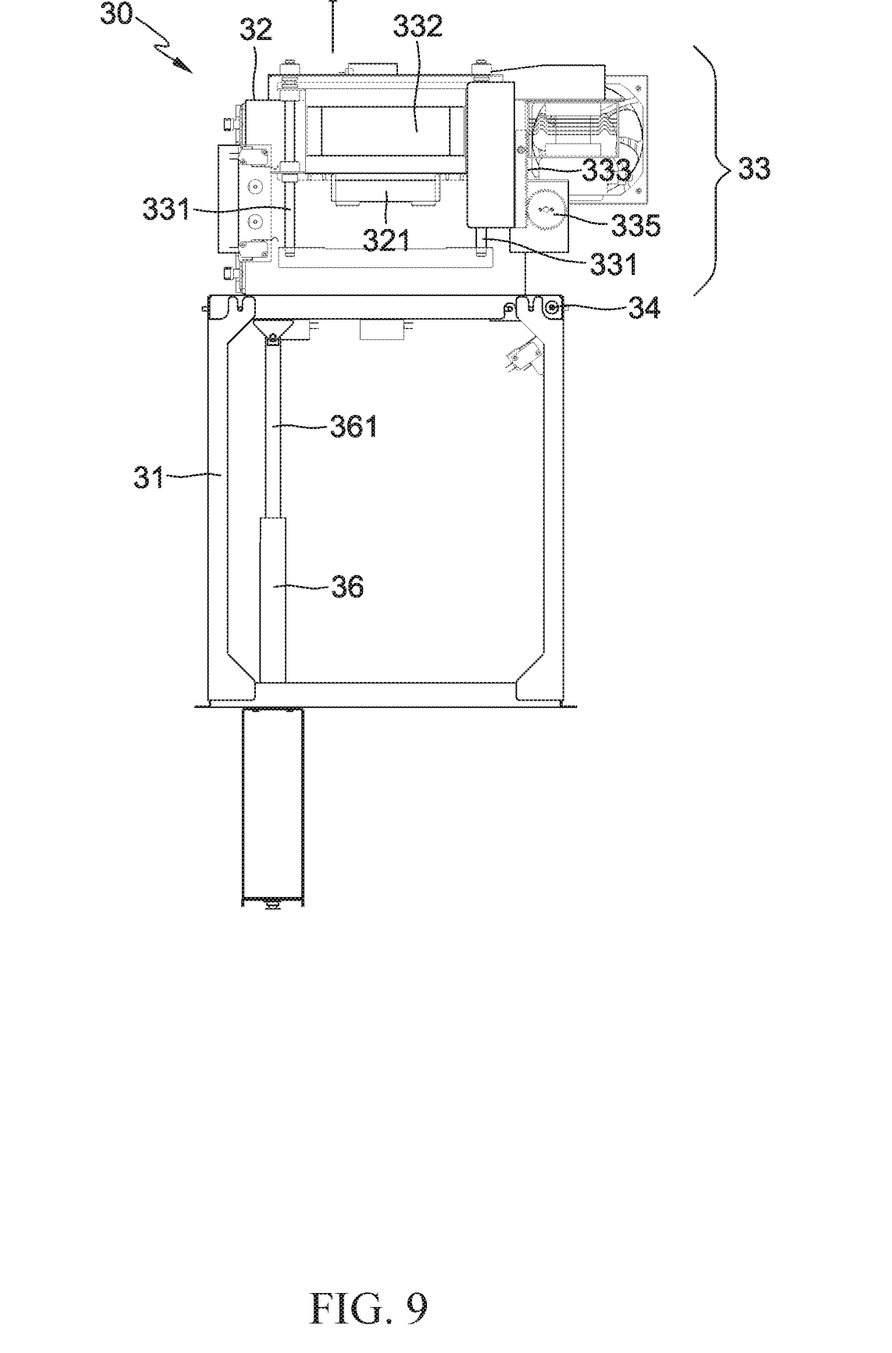
FIG. 9 is a side view of the microwave heating device of the present invention, where a side door opening and closing device is moved upward to cause a side door configured on a microwave heater to be opened.
Figure 10:
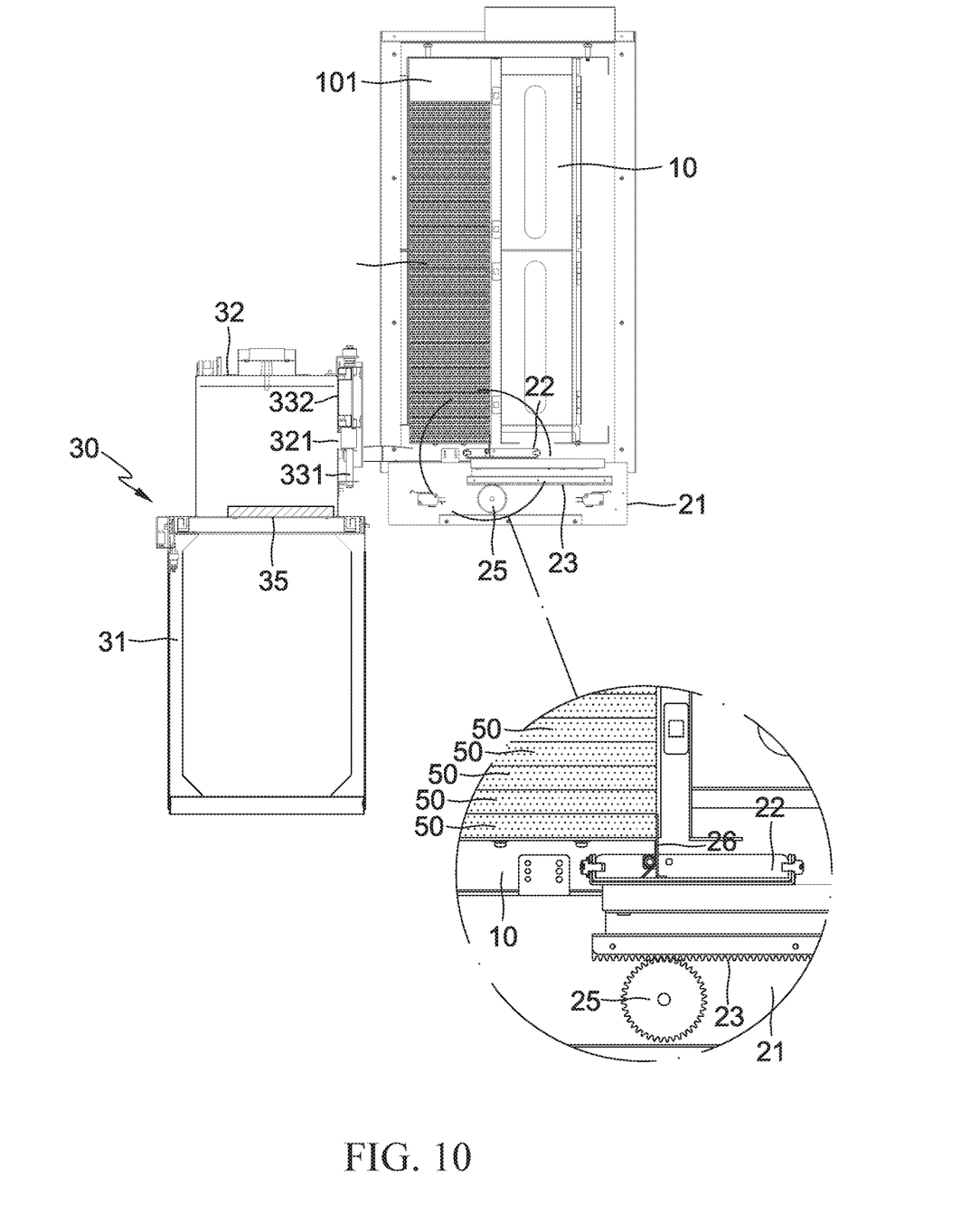
FIGS. 10 and 11 respectively are a cross-sectional view of the present invention, where the side door opening and closing device is moved upward to cause the side door configured on the microwave heater to be opened.
Figure 11:
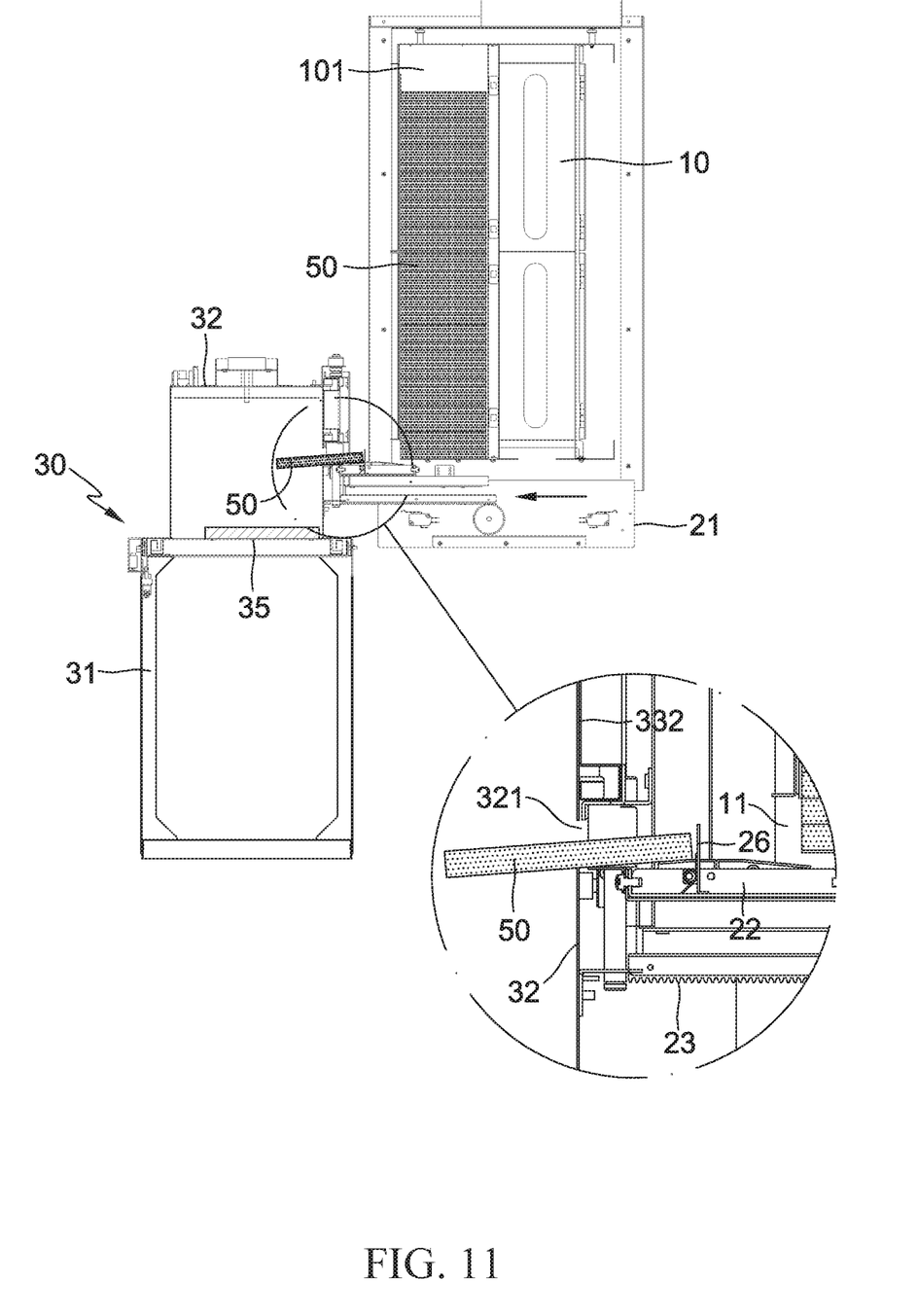
Figure 12:
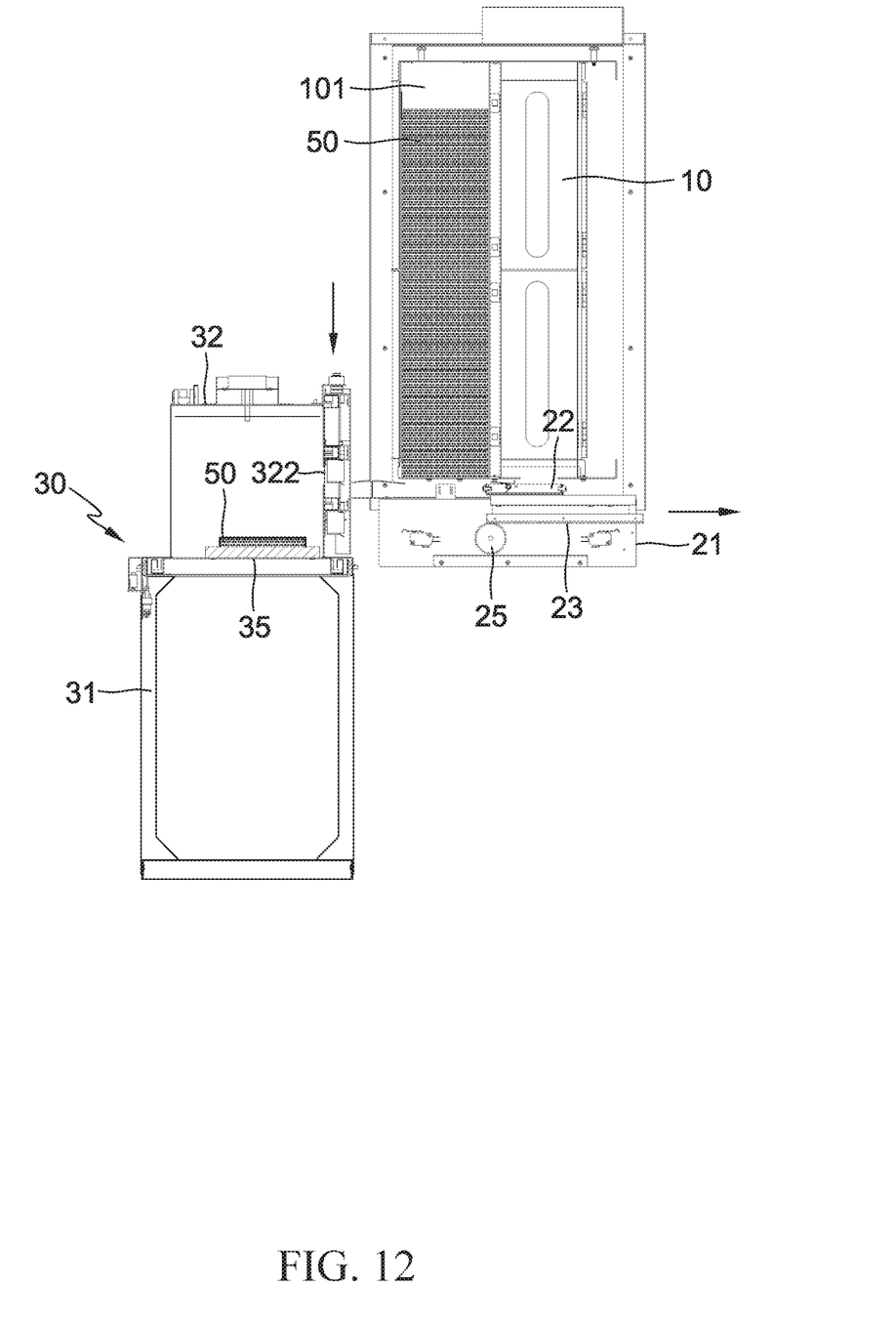
FIG. 12 is a cross-sectional view of the present invention, where a popcorn kernel package drops on a lower cover plate, the side door opening and closing device is moved downward to close the side door, and the delivering device is moved backward to reset.

With the above structures, the present invention, as FIG. 7 shows, is installed on a popcorn machine 40, and the front side of the popcorn machine 40 is configured with a take-up port 41 below the drive element 36 configured on the microwave heating device 30. When the present invention is put into practice, a plurality of popcorn kernel packages 50 are first stacked in the storage rack 10 while the push seat 22 of the delivering device 20 is exactly positioned below the storage rack 10, and the push plate 26 is stopped by the storage rack 10 to turn and bend downward to be horizontal, and the lower cover plate 35 of the microwave heating device 30 is covered and closed on the bottom end of the microwave heater 32, as FIG. 8 shows. When popcorn is purchased, the side door opening and closing device 33 of the microwave heating device 30 causes the drive motor 334 to drive the transmission gear 335 to rotate, allowing the tooth row 333 configured on the door plate 332 to move upward, and the door plate 332 can be synchronously moved upward along the guide rods 331 so as to open and expose the side door 32 of the microwave heater 32 as FIGS. 8 and 9 show. Thereafter, the delivering device 20 configured below the storage rack 10 then causes the drive motor 24 to drive the gear 25 to rotate to drive the tooth row 23 to move forward and to drive the push seat 22 and fixing rack 21 to move forward synchronously. When the push plate 26 is moved below the long gap 12, the push plate is pushed by the spring 27 to rotate to be upright as FIG. 10 shows. Whereby, the push plate 26 can push the lowest popcorn kernel package 50 to move forward, allowing the popcorn kernel package 50 to be sent into the microwave heater 32 via the side door 321 of the microwave heater 32 and to drop on the lower cover 35 as FIGS. 11 and 12 show.

Next, the delivering device 20 causes the drive motor 21 to drive the gear 25 to rotate to drive the tooth row 23 to move rearward and to drive the push seat 22 and fixing rack 21 to move rearward synchronously to reset, and the push plate 26 configured on the push seat 22 is stopped by the storage rack 10 to turn to bend downward. At the same time, the side door opening and closing device 33 of the microwave heater 30 then causes the drive motor 334 to drive the transmission gear 335 to move the tooth row 333 configured on the door plate 332 to move downward, allowing the door plate 332 to move downward along the guide rods 331 synchronously to close the side door 321 of the microwave heater 32 as FIG. 12 shows. Thereafter, the microwave heater 32 can then heat the popcorn kernel package 50 therein to cause the popcorn kernels inside the corn popcorn kernel package 50 be heated to become popcorn, and the popcorn kernel package 50 is then inflated to become a heated popcorn package 51.

Figure 13:
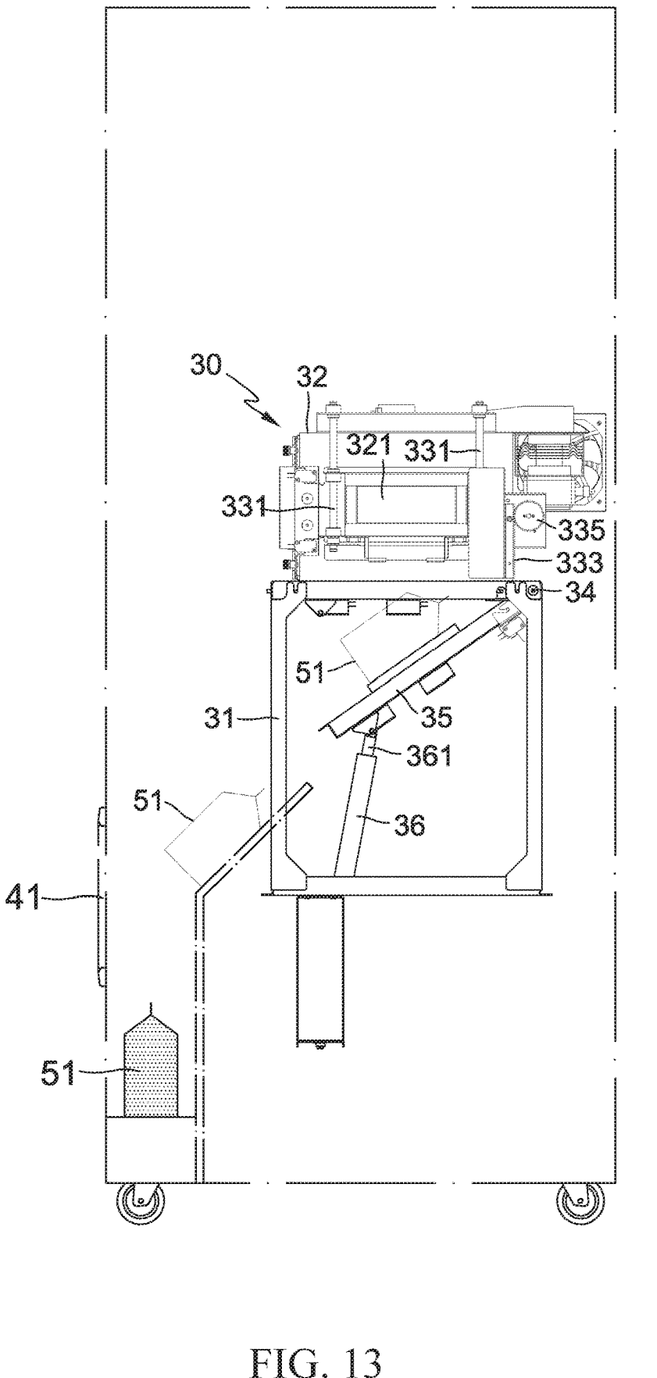
FIG. 13 is a side view of the present invention, where the lower cover plate is rotated downward to incline and heated popcorn package drops to a take-up port.

Next, the drive element 36 of the microwave heater 30 then drives the lower cover plate 35 to rotate downward with the shaft 34 as a fulcrum after the heating is completed, allowing the lower cover plate 35 to be inclined, and the heated popcorn package 51 to slide downward to the take-up port 41 of the popcorn machine 40 as FIG. 13 shows. Thereafter, the drive element 36 then drives the lower cover plate 35 to rotate upward with the shaft 34 as a fulcrum to cover the bottom side of the microwave heater 32 again as FIG. 8 shows. Whereby, the heated popcorn package 51 can be take away from the take-up port 41.

According to the above, the present invention, in the embodiment, uses the drive motor 24 and gear 25 to drive the push plate 26 in the delivering device 20, and uses the drive motor 334 and transmission gear 33 to drive the door plate 332 in the side door opening and closing device 33. However, a pneumatic (hydraulic) cylinder, belt or chain may also be used as a power output to allow the push plate 26, door plate 332 to be moved forward and backward, up and down smoothly.

Therefore, the present invention has the follow advantages over the prior arts:

1. because the present invention configures a side door 321 on one side of the microwave heater 32 corresponding to the storage rack 10, and also configures the side door closing and closing device 33 to open or close the side door 321, it allows the corn grain package 50 to enter the microwave heater 32 via the side door 321, and can prevent the microwaves from leakage, really having use convenience and safety;
2. because the delivering device 20 is configured below the storage rack 10 according to the present invention, the lowest popcorn kernel package 50 can be directly pushed to the side door 321 of the microwave heater 32, allowing the popcorn kernel package 50 to drop into the microwave heater 32 via the side door 321 so that the present invention indeed has delivery convenience and rapidity;
3. because the bottom of the microwave heater 32 of the present invention is formed into an open end and covered with a lower cover plate 35, the lower cover plate 35 can be not only used as the bottom of the microwave heater 32 but driven by the drive element 36 to rotate to incline, allowing the heated popcorn to slide to drop to the take-up port 41 and thus to be taken away, indeed having operation convenience, safety and rapidity; and
4. further, because the present invention directly uses the delivering device 20 to push the corn grain package 50 into the microwave heater 32 and then opens the lower cover plate 35 below the microwave heater 32, the heated popcorn package 51 can then be allowed to drop into the take-up port, thereby not requiring a vacuum suction device to be used as a mobile media for the popcorn package 51 so that the present invention can not only save assembly space but reduce the occurrence of damage caused by the device being opened over and over again.

I claim:

1. A commodity delivery and microwave system for a popcorn vending machine, comprising a storage rack, delivering device and microwave heating device, wherein:
    said storage rack, adapted to mount popcorn kernel packages, an opening configured on a lower side of said storage rack, said opening allowing said popcorn kernel package to be moved out therethrough, a bottom of said storage rack configured with a long gap, said long gap formed into an open end, and said open end correspondingly configured below said opening;
    said delivering device, configured below said storage rack, and adapted to push said popcorn kernel package out of said storage rack and send said popcorn kernel package into said microwave heating device; and
    said microwave heating device, configured beside said storage rack and comprising a support bracket, said support bracket configured with a microwave heater, a side door configured on one side of said microwave heater corresponding to storage rack, a bottom of said microwave heater being open, a door opening and closing device configured on a position of said microwave heater corresponding to said side door, said side door opening and closing device adapted to open or close said side door, a lower cover plate coupled pivotally to said support bracket through a shaft, said lower cover plate exactly covered and closed on said bottom of said microwave heater, said support bracket configured with a drive element, and a drive end of said drive element coupled pivotally to said lower cover plate, allowing said lower cover plate to be driven to rotate with said shaft as a fulcrum.

2. The system according to claim 1, wherein said side door opening and closing device comprises two guide rods configured on one side of said microwave heater corresponding to said side door, a door plate is disposed between said two guide rods, said door plate is movable up and down between said two guide rods, said door plate is configured with a tooth row, said side door opening and closing device further comprises a drive motor configured on said microwave heater, said drive motor is in connection with a transmission gear in engagement with said tooth row configured on said door plate, said drive motor drives said transmission gear to rotate, allowing said transmission gear to drive said tooth row of said door plate to move up and down, and drives said door plate to move up and down synchronously.

3. The system according to claim 1, wherein said storage rack is a rotatable storage rack having several storage tanks, a lower side of each said storage tank is configured with an opening allowing said popcorn kernel package to be moved out therethrough, a bottom of said storage rack is configured with a long gap formed into an open end correspondingly configured below said opening.

4. The system according to claim 1, wherein said delivering device comprises a fixing rack configured with a push seat, a tooth row is configured on a lower side of said push seat, said fixing rack is configured with a drive motor in connection with a gear in engagement with said tooth row, said drive motor is used to drive said gear to rotate, said gear drives said tooth row to move forward and backward and drives said push seat and fixing rack to move forward and backward synchronously, a push plate is coupled pivotally to said push seat through a pivot point, a spring is configured between said push plate and push seat, allowing said push plate to be pushed against by said spring to be erected, and said push plate is rotated downward with said pivot point as a center point when exerted with a force.

5. The system according to claim 3, wherein said delivering device comprises a fixing rack configured with a push seat, a tooth row is configured on a lower side of said push seat, said fixing rack is configured with a drive motor in connection with a gear in engagement with said tooth row, said drive motor is used to drive said gear to rotate, said gear drives said tooth row to move forward and backward and drives said push seat and fixing rack to move forward and backward synchronously, a push plate is coupled pivotally to said push seat through a pivot point, a spring is configured between said push plate and push seat, allowing said push plate to be pushed against by said spring to be erected, and said push plate is rotated downward with said pivot point as a center point when exerted with a force.

6. The system according to claim 3, wherein said side door opening and closing device comprises two guide rods configured on one side of said microwave heater corresponding to said side door, a door plate is disposed between said two guide rods, said door plate is movable up and down between said two guide rods, said door plate is configured with a tooth row, said side door opening and closing device further comprises a drive motor configured on said microwave heater, said drive motor is in connection with a transmission gear in engagement with said tooth row configured on said door plate, said drive motor drives said transmission gear to rotate, allowing said transmission gear to drive said tooth row of said door plate to move up and down, and drives said door plate to move up and down synchronously.

7. The system according to claim 4, wherein said side door opening and closing device comprises two guide rods configured on one side of said microwave heater corresponding to said side door, a door plate is disposed between said two guide rods, said door plate is movable up and down between said two guide rods, said door plate is configured with a tooth row, said side door opening and closing device further comprises a drive motor configured on said microwave heater, said drive motor is in connection with a transmission gear in engagement with said tooth row configured on said door plate, said drive motor drives said transmission gear to rotate, allowing said transmission gear to drive said tooth row of said door plate to move up and down, and drives said door plate to move up and down synchronously.

8. The system according to claim 5, wherein said side door opening and closing device comprises two guide rods configured on one side of said microwave heater corresponding to said side door, a door plate is disposed between said two guide rods, said door plate is movable up and down between said two guide rods, said door plate is configured with a tooth row, said side door opening and closing device further comprises a drive motor configured on said microwave heater, said drive motor is in connection with a transmission gear in engagement with said tooth row configured on said door plate, said drive motor drives said transmission gear to rotate, allowing said transmission gear to drive said tooth row of said door plate to move up and down, and drives said door plate to move up and down synchronously.

* * * * *